(12) United States Patent
Nishioki et al.

(10) Patent No.: US 6,523,273 B1
(45) Date of Patent: Feb. 25, 2003

(54) RESEAT SYSTEM FOR TOUCH PROBE IN COORDINATES MEASURING MACHINE

(75) Inventors: Nobuhisa Nishioki, Tsukuba (JP); Satoshi Koga, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/596,189

(22) Filed: Jun. 16, 2000

(30) Foreign Application Priority Data

Jun. 18, 1999 (JP) .......................................... 11-172507

(51) Int. Cl.[7] .......................... G01B 21/00; G01B 7/00; G01B 11/24
(52) U.S. Cl. .......................................... 33/559; 33/561
(58) Field of Search .......................... 33/503, 504, 556, 33/557, 558, 559, 560, 561

(56) References Cited

U.S. PATENT DOCUMENTS

| | | | |
|---|---|---|---|
| 4,532,713 A | * | 8/1985 | Feichtinger .................. 33/559 |
| 4,942,671 A | * | 7/1990 | Enderle et al. ................ 33/559 |
| 5,018,280 A | * | 5/1991 | Enderle et al. ................ 33/561 |
| 5,756,886 A | * | 5/1998 | Nishimura et al. ............ 33/558 |

FOREIGN PATENT DOCUMENTS

| | | | |
|---|---|---|---|
| EP | 0764827 | 3/1997 | .......... G01B/5/016 |
| JP | 59-092301 | 5/1984 | |
| JP | 59-116502 | 7/1984 | |
| JP | 03115901 A | * 5/1991 | .................. 33/559 |

* cited by examiner

Primary Examiner—Randy W. Gibson
(74) Attorney, Agent, or Firm—Webb Ziesenheim Logsdon Orkin & Hanson, P.C.

(57) ABSTRACT

A reseat system capable of restraining reseat shift in returning from escape movement and thus capable of obtaining reseat return accuracy without adding separate mechanism is provided. A locus drawn by a tip of a stylus when the stylus moves parallel to an axis thereof at a rest position while a hard ball on a fixed component is in contact with a cylindrical body on a movable-component having the stylus is inclined in a direction of a biasing force. When a pressing force is applied to the movable component, since a reaction force against the pressing force is generated at a contact point of the cylindrical body and the hard ball, reseat shift of the movable component can be restrained.

12 Claims, 9 Drawing Sheets

● RESEAT POSITION OF CONVENTIONAL RESEAT SYSTEM

☐ RESEAT POSITION OF RESEAT SYSTEM ACCORDING TO FIRST EMBODIMENT

RESEAT SYSTEM FOR TOUCH PROBE IN COORDINATES MEASURING MACHINE

BACKGROUND OF THE INVENTION

1. Field of the Invention

The present invention relates to a reseat system as a component of a touch signal probe installed in a coordinates measuring machine. More specifically, it relates to an arrangement of a reseat system for improving reproducibility of the return position of the reseat system during the return movement after the escape movement of the reseat system.

2. Description of Related Art

In a coordinates measuring machine, a probe movable in three-dimensional directions touches a workpiece on a fixed table and coordinate values of the respective axes (respective axes in the three-dimensional directions) when the probe touches the workpiece are read so that the dimensions and configuration of the workpiece are measured based on the coordinate values. Accordingly, a touch signal probe capable of indicating contact between a probe and a workpiece as an electric touch signal is widely used.

Figure 6:
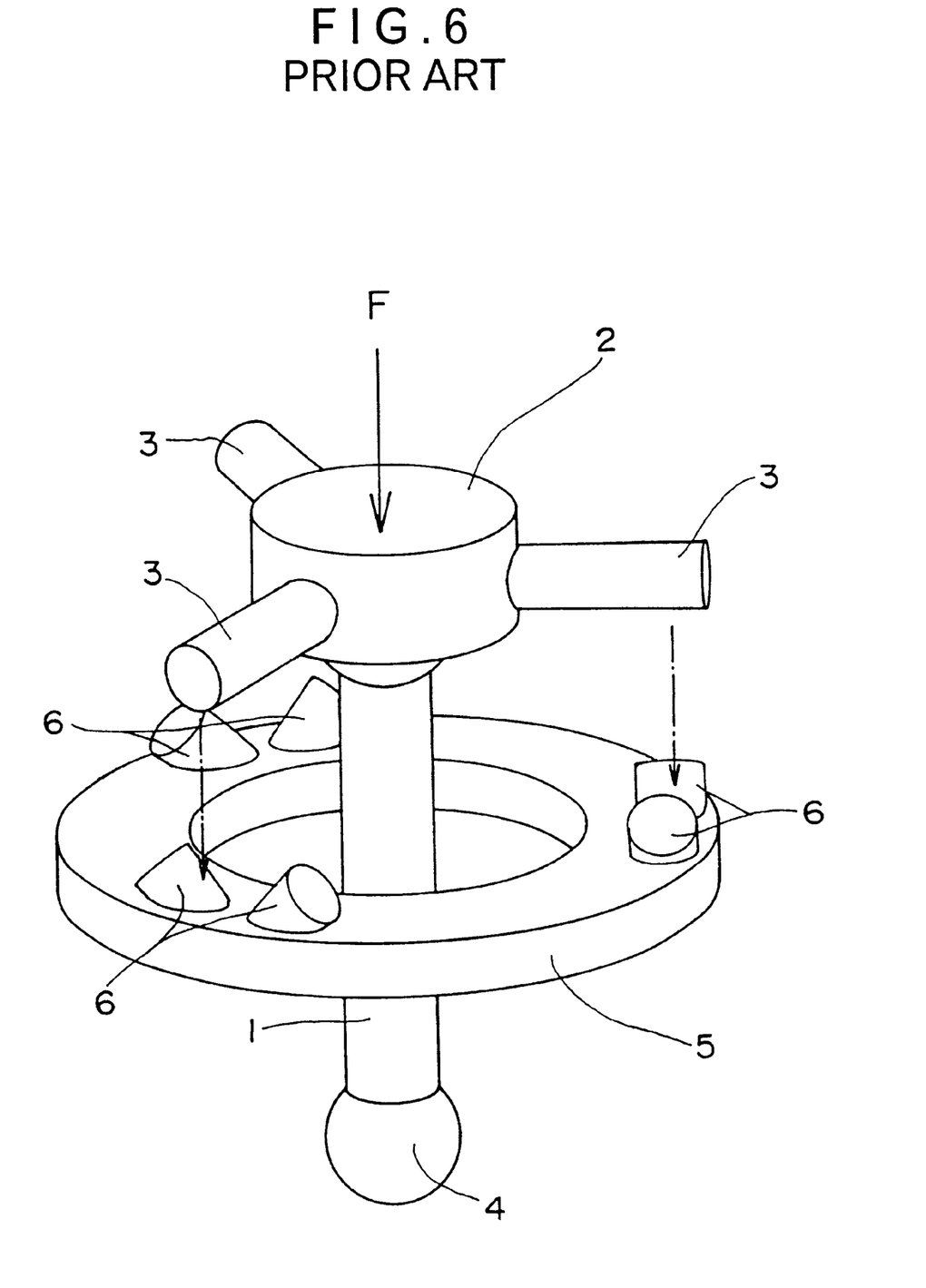
FIG. 6 is a perspective view showing a conventional reseat system.

FIG. 6 shows a conventional touch signal probe. In the figure a stylus 1 is fixed to a movable component 2. A contact ball 4 is provided at a distal end of the stylus 1. Three cylindrical bodies 3 radially project at 120 degree intervals around an axis of the stylus 1 from the periphery of the movable component 2 on a plane perpendicular to the axis of the stylus 1. On the other hand, a fixed component 5 has three pairs of V-shaped holding portions 6 positioned corresponding to the cylindrical bodies 3 of the movable component 2. The cylindrical body 3 and the V-shaped holding portions 6 constitute a reseat component for defining the relative position of the fixed component 5 and the movable component 2 at one place.

According to the above arrangement, the movable component 2 is pressed to the fixed component 5 by virtue of a biasing force F of a biasing component (not shown) and the movable component 2 is forcibly brought into contact with the fixed component 5 through the reseat component. When pressing force from the workpiece is not applied to the distal end of the stylus 1, the movable component 2 rests on the fixed component at six contact points. In other words, respective cylindrical bodies 3 of the movable component 2 each rest on the respective cylindrical bodies 6 at two points for a total of six points. Accordingly, the reseat system is called as a six-point contact reseat system.

Figure 7:
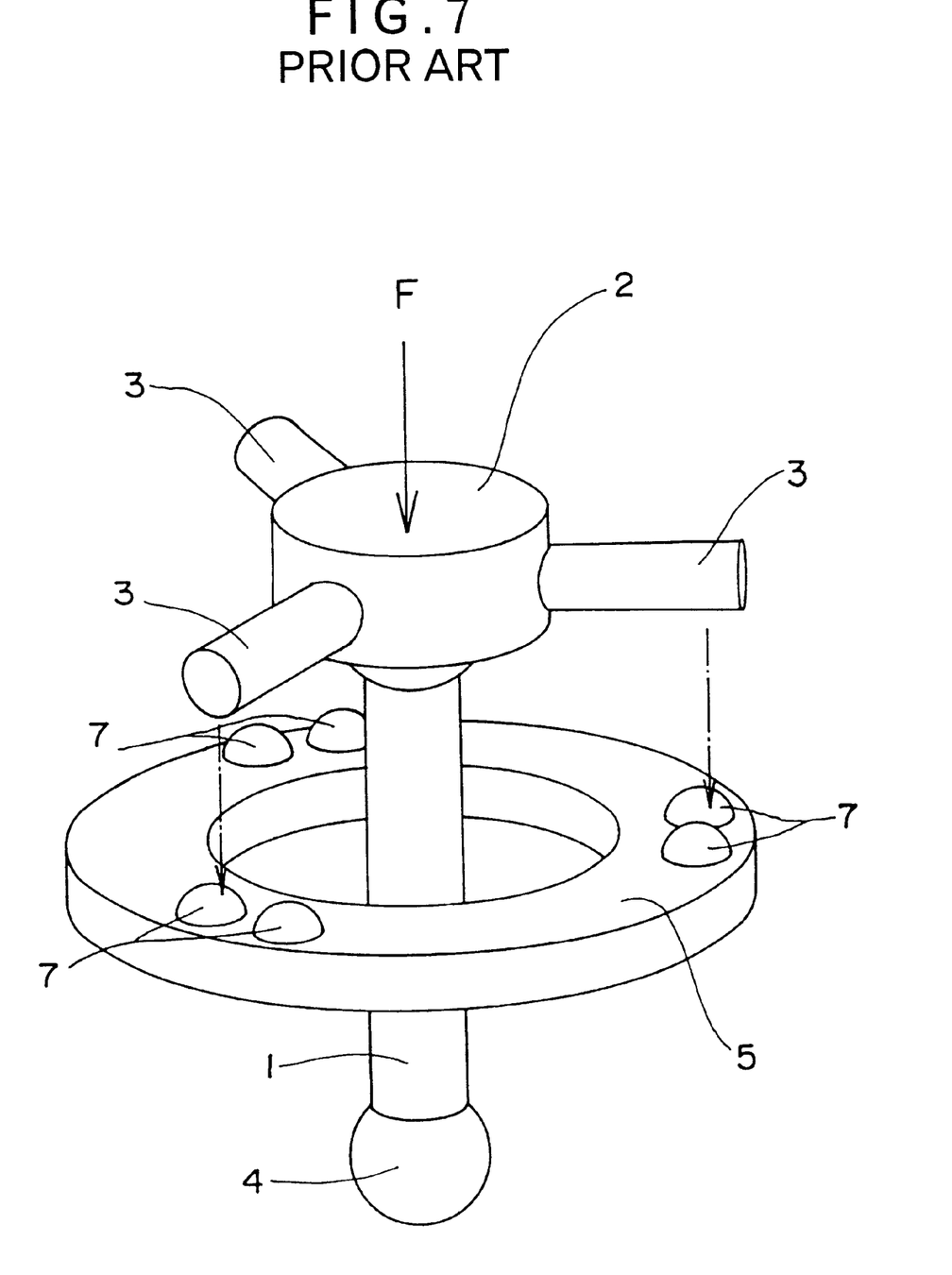
FIG. 7 is a perspective view showing another conventional reseat system.
Figure 8:
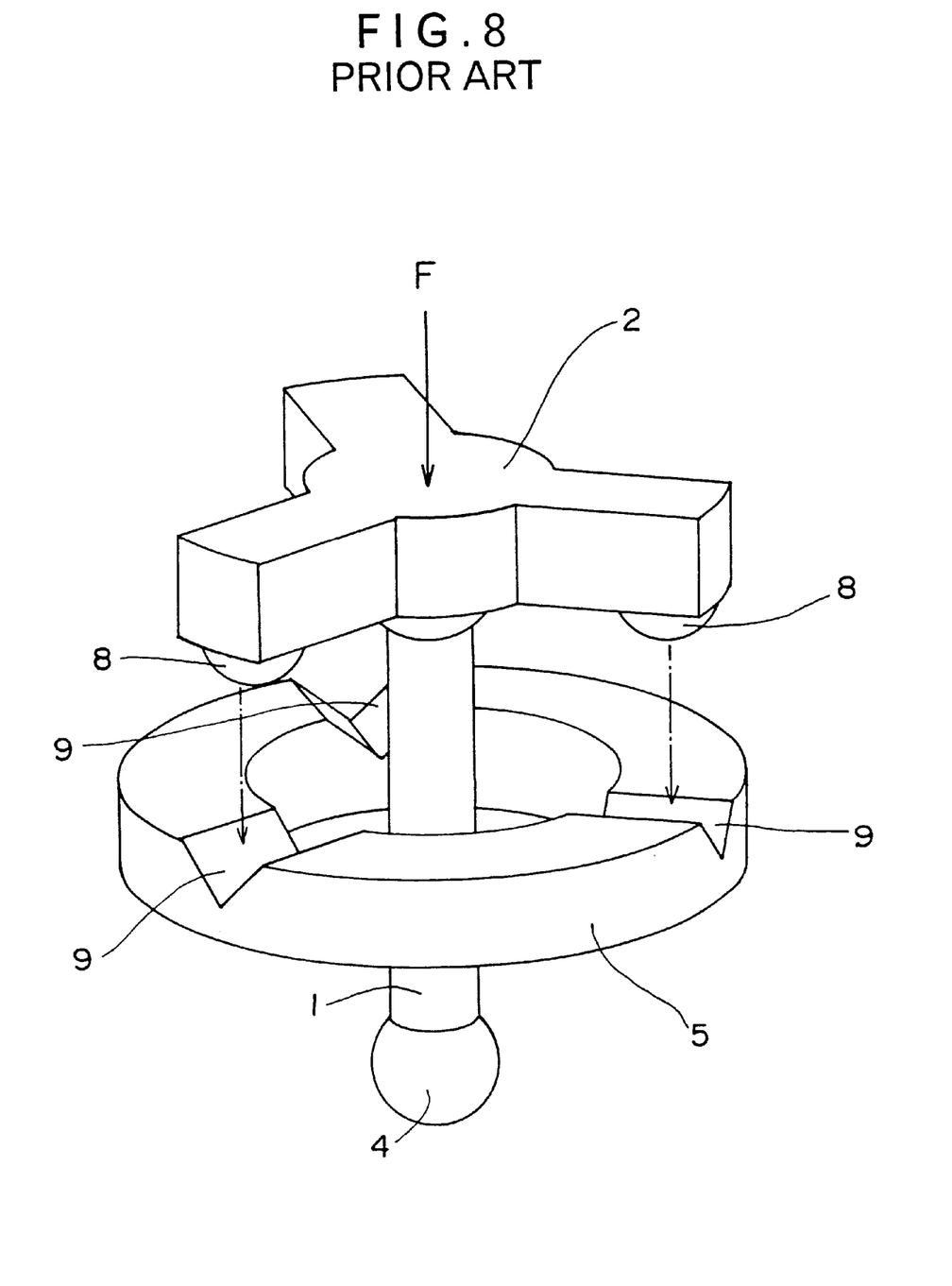
FIG. 8 is a perspective view showing another conventional reseat system.

According to the six-point contact reseat system, the reseat position of the movable component after an escape movement can be located at only one place. In other words, assuming that the stylus 1 is displaced parallel to the axial direction at the rest position of the stylus 1 while maintaining contact between the reseat component on the movable component side and the reseat component on the fixed component side toward respective contact points, respective loci drawn by the tip of the stylus cross the axis of the stylus at the rest position. According to this arrangement, the stylus 1 returns to a unique rest position by restoring contact with the respective contact points by the biasing force F from a biasing component (not shown). When a pressing force from a workpiece is not applied to the distal end of the stylus 1, the movable component 2 rests on the fixed component 5 at six contact points. In other words, respective cylindrical bodies 3 of the movable component 2 rest on the V-shaped holding portions 6 at two points for a total six points. Accordingly, such arrangement is called a "six-point contact reseat system". The six-point contact reseat system can use a pair of hard balls 7 as reseat component on the fixed component side (FIG. 7). Alternatively, one hard ball 8 may be used as a reseat component on the movable component side with a V-shape groove 9 provided on a surface of the fixed component as the reseat component on the fixed component side (FIG. 8).

According to the six-point contact reseat system, the return position after an escape movement of the fixed component can be defined at one place. Specifically, assuming that the stylus 1 displaces parallel to an axial direction of the stylus 1 at rest position toward respective contact points while keeping contact between the reseat component on the movable component side and the reseat component on the fixed component side, respective loci drawn by the tip of the stylus crosses the axis of the stylus at the rest position. According to the above arrangement, the stylus 1 returns to a uniquely defined rest position only by restoring contact between the respective contact points by the biasing force F during return movement of the movable component 2 after the escape movement by virtue of the pressing force from the workpiece, so that the rest position of the stylus 1 can be maintained at one place.

Since the position of the movable component relative to the fixed component can be set unique by the six-point contact reseat system., the six-point contact reseat system has high anti-vibration rigidity. Further, irrespective of the direction of the outside pressing force, the six-point contact reseat system has high reseat ability in a relatively rough unit of, for instance, 10 $\mu$m.

However, the above-described six-point contact reseat system causes an error ("reseat shift error") in a further fine unit of, for instance, 1 $\mu$m observed in the return movement after contact, the error being caused because the movable component is pushed by the workpiece during the escape movement of the movable component to cause displacement relative to the fixed component.

Figure 9A:
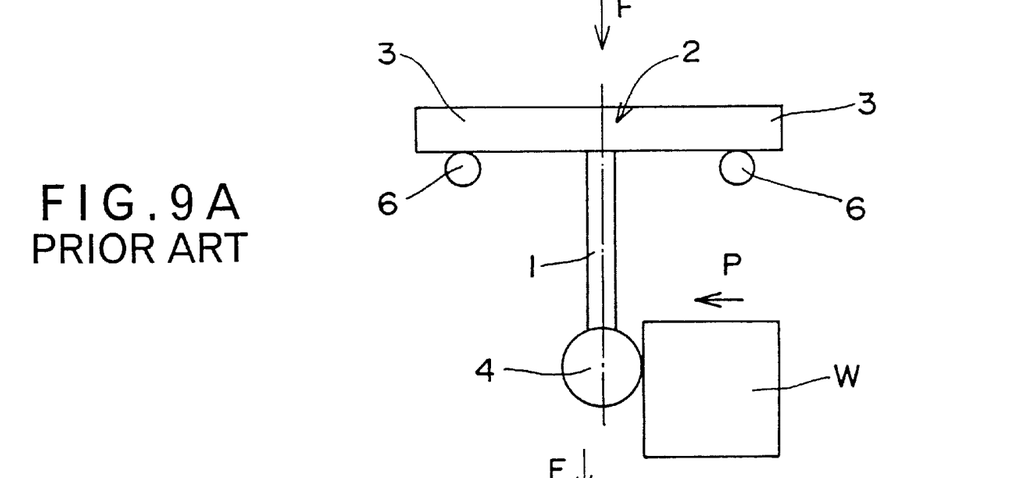
FIGS. 9(A) to (C) are schematic illustrations showing problem associated with the conventional reseat system.
Figure 9B:
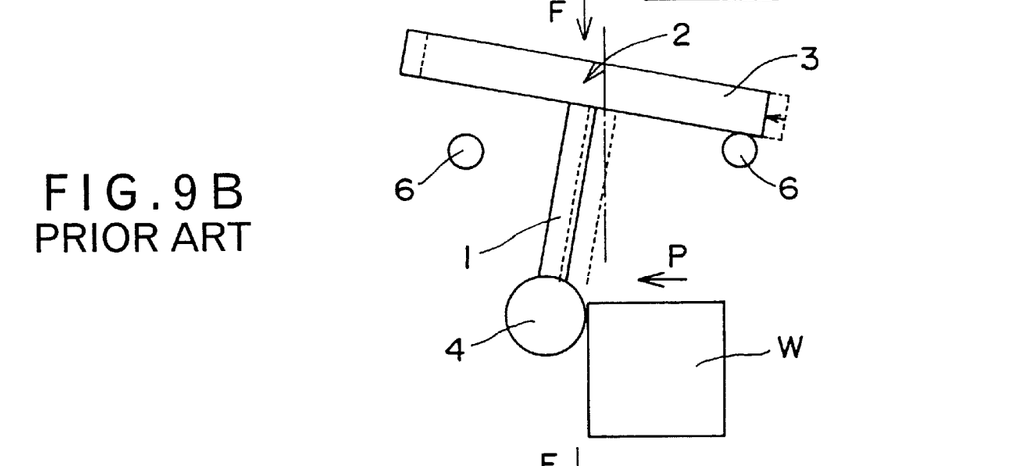
Figure 9C:
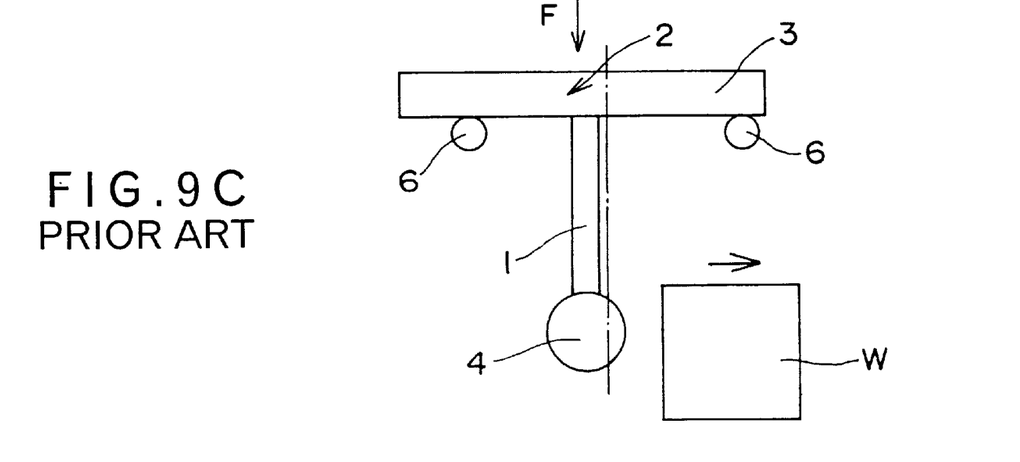

Specifically, as shown in FIG. 9(A), when the contact ball 4 of the conventional reseat system touches the workpiece W, the stylus 1 moves in left direction in the figure as shown in FIG. 9(B). At this time, a small reaction force is caused between the movable component 2 and the fixed component 5, so that the movable component 2 slightly slides in the left direction in the figure. When the workpiece W and the stylus 1 connected to the movable component 2 are no more in contact with each other as shown in FIG. 9(C), the movable component 2 conducts the return movement by virtue of the biasing force F, where the axial position of the movable component 2 is shifted on account of the aforesaid slide movement. The shift directly affects on measurement accuracy of the probe.

The Applicants of the present invention have proposed a reseat system capable of correcting the reseat position shift after return movement (European Patent Publication No. 0764827 A2), whereby an electric voltage is applied to a piezoelectric element provided on the fixed component to administer directions of frictional force applied to a reseat system.

However, according to the above arrangement, the reproducibility of final return position is improved only by actuating the piezoelectric element after causing the reseat shift. Therefore, a measurement wait time is necessary before correction, thus hindering the efficiency of measurement work.

Further, since parts costs are increased for the piezoelectric element and an alignment process is necessary for attaching the piezoelectric element, the total production cost increases.

SUMMARY OF THE INVENTION

An object of the present invention is to provide a reseat system capable of restraining reseat shift upon returning from an escape movement to obtain an accurate return to the reseat position without adding a separate mechanism.

A reseat system according to the present invention includes: a fixed component; a movable component having a stylus to be settled at a predetermined rest position; first reseat components provided at three places on the fixed component mutually spaced apart; and second reseat components provided on the movable component to be in contact with the first reseat components at predetermined contact points, where, assuming that a first reseat component and a second reseat component corresponding thereto keep contact with each other and the stylus moves while keeping an axis of the stylus substantially parallel with an axis thereof at the rest position, a locus drawn by the tip of the stylus crosses the axis of the stylus at the rest position; and where, when an outside force is applied to the movable component, the tip of the stylus of the movable component can be displaced relative to the fixed component by releasing contact of either one of a first and second reseat component and, when the outside force is ceased to be applied to the movable component, the movable component returns to the rest position by a biasing force applied to the movable component in a direction from a base end of the stylus to a distal end thereof; the reseat system being characterized in that the locus drawn by the tip of the stylus is inclined in the direction of the biasing force moving away from the-axis of the stylus at the rest position.

According to the above arrangement, the reseat shift in returning from the escape movement can be effectively restrained.

Specifically, in the conventional reseat system, assuming that the stylus displaces parallel to the axis of the stylus at the rest position while keeping contact between the reseat system on the movable component side and the reseat system on the fixed component side, the locus drawn by the tip of the stylus extends in a direction perpendicular to the axis of the stylus at the rest position. Accordingly, little reaction force reverse to a component of the pressing force applied to the contact point is generated, thus causing the reseat shift in the escape movement.

On the other hand, according to the reseat system of the present invention, assuming that the stylus displaces parallel to the axis of the stylus at the rest position while keeping contact between the reseat system on the movable component side and the reseat system on the fixed component side, the locus drawn by the tip of the stylus is inclined in the direction of the biasing force moving away from the axis of the stylus at the rest position, so that the reaction force reverse to a component of the pressing force applied to the contact point is generated at the contact point and the reseat shift in the escape movement can be restrained.

In the present invention, when an angle between the locus (L2) drawn by the tip of the stylus and a plane perpendicular to the axis of the stylus at the rest position is represented by $\theta$, $\theta$ may preferably satisfy the following inequality of:

$$(Fp^*\sin(\alpha+\Phi)\sin(\alpha-\theta)+Ft^*\cos(\beta-\Phi)\sin(\beta+\theta))^*\mu > |Ft^*\cos(\beta-\Phi)\cos(\beta+\theta)-Fp^*\sin(\alpha+\Phi)\cos(\alpha-\theta)|$$

where $\alpha$ represents an angle formed by a straight line connecting a point on which the biasing force is applied to the movable component and a contact point of the first and the second reseat component and the plane perpendicular to the axis of the stylus at the rest position;

$\beta$ represents an angle formed by a point on which the outside force is applied to the stylus and the contact point of the first and the second reseat component and the plane perpendicular to the axis of the stylus at the rest position;

$\Phi$ represents an angle formed by the axis of the stylus when the outside force is applied to the stylus and the axis of the stylus at the rest position thereof;

Fp represents a magnitude of the biasing force;

Ft represents a magnitude of the outside force; and $\mu$ represents friction coefficient of the first and the second reseat component.

Since the inclination angle of the locus drawn by the tip of the stylus satisfies the above relationship, an object of the present invention, i.e., prevention of reseat shift in return movement of the movable component can be effectively achieved.

Specifically, when the stylus relatively moves and touches the workpiece, the movable component is pushed in the outside force direction by the angle $\Phi$ by receiving the outside force from the workpiece. At this time, biasing force Fp works on the application point of the biasing force and the pressing force Ft as the outside force works on the contact point of the stylus and the workpiece respectively. The forces are transmitted to the contact point of the reseat component on the fixed component side and the reseat component on the movable component side through the stylus. At this time, a component of the biasing force applied to the contact point of the reseat component on the fixed component side can be represented as $Fp^*\sin(\alpha+\Phi)$ and a component of the outside force can be represented as $Ft^*\cos(\beta+\Phi)$.

Therefore, the pressing force applied on contact point of the reseat component on the fixed component side and the reseat component on the movable component side can be obtained by resolving and compositing the force applied to the contact point of the reseat component on the fixed component side and the reseat component on the movable component side in perpendicular direction relative to a plane for the movable component to move along when the tip of the stylus moves along the locus (referred to contact surface hereinafter). Here, friction force on the contact point of the reseat component on the fixed component side and the reseat component on the movable component side can be represented by multiplying the pressing force and friction coefficient $\mu$, specifically as follows:

Friction force applied on the contact point = $(Fp^*\sin(\alpha+\Phi)\sin(\alpha-\theta)+Ft^*\cos(\beta-\Phi)\sin(\beta+\theta))^*\mu$ Further, a force for causing the reseat shift of the movable component can be obtained by resolving and compositing the force applied to the contact surface parallel to the contact surface. The component of force parallel to the contact point is given as an absolute value of difference between a force as a component of the outside force for sliding in outside force application direction and a force as a component of the biasing force for sliding to the outside of the reseat system, which is specifically represented as follows:

Component of force parallel to the contact surface = force for causing reseat shift = $|Ft^*\cos(\beta-\Phi)\cos(\beta+\theta)-Fp^*\sin(\alpha+\Phi)\cos(\alpha-\theta)|$ In the above, when a is small (the application point of the biasing force is adjacent to the workpiece) or $\Phi$ is small (the movable component is pushed by the outside force only for small amount at initial stage of contact), the force for causing reseat shift in the application direction of the outside force is dominant as described above. Accordingly, $\theta$ has to be defined for a certain magnitude.

On the other hand, when α is large (the application point of the biasing force is remote from the workpiece) or Φ is set large (the movable component is greatly pushed after contact), a force for sliding the movable component to the outside (in a direction approaching to the workpiece) of the reseat system by virtue of the biasing force is dominant. Accordingly, θ has to be defined within a predetermined range.

Therefore, when the predetermined α and β are given according to a construction of the reseat system, and the biasing force Fp, the outside force Ft applied to the stylus and maximum push angle Φ are estimated according to a measurement condition, the relationship of (friction force applied on the contact point)>(force for causing reseat shift) can be satisfied by setting the inclination angle θ in the above-described manner. Therefore, the reseat shift during contact and return movement can be effectively prevented.

In the above arrangement, either one of the first and the second reseat component may preferably be a cylinder having larger outer diameter on a side remote from the stylus than outer diameter on a side adjacent to the stylus and the other may preferably be a pair of balls.

Accordingly, assuming that the stylus displaces parallel to the axis of the stylus at the rest position while keeping contact between the reseat system on the movable component side and the reseat system on the fixed component side, the locus drawn by the tip of the stylus is inclined in the biasing force direction as being separated from the axis of the stylus at the rest position in accordance with the inclination of the circumference of the cylinder having larger outer diameter on the side remote from the stylus than the outer diameter on the stylus side (so-called tapered surface). Therefore, the present invention can be effectively implemented.

Alternatively, either one of the first and the second reseat components may preferably be a cylinder having predetermined inclination in an axial direction and the other may preferably be a pair of balls.

Accordingly, assuming that the stylus displaces parallel to the axis of the stylus at the rest position while keeping contact between the reseat system on the movable component side and the reseat system on the fixed component side, the locus drawn by the tip of the stylus is inclined in the biasing force direction as being separated from the axis of the stylus at the rest position in accordance with inclination of the cylinder having predetermined inclination in the axial direction. Therefore, the present invention can be effectively performed only by partially changing the construction of the reseat system while commonly using the parts and production process of the conventional reseat system.

In the present invention, the other of the first and the second reseat components may preferably be a pair of cylinders arranged in a V-shape. With the pair of cylinders, the six-point reseat construction can also be secured, thus effecting the present invention.

Further, in the present invention, either one of the first and the second reseat components may preferably be a ball and the other may preferably be a V-shaped groove having a predetermined inclination in an axial direction.

Accordingly, assuming that the stylus displaces parallel to the axis of the stylus at the rest position while keeping contact between the reseat system on the movable component side and the reseat system on the fixed component side, the locus drawn by the tip of the stylus is inclined in the biasing force direction moving away from the axis of the stylus at the rest position in accordance with inclination of the V-shape groove having predetermined inclination in the axial direction. Therefore, since the reaction force reverse to the component of the pressing force applied on the contact point is generated on the contact point, the reseat shift in returning from the escape movement can be effectively restrained.

DETAILED DESCRIPTION OF THE PREFERRED EMBODIMENTS

First Embodiment

An embodiment of the present invention will be described below with reference to the attached drawings. Incidentally, in the respective embodiments, the same reference numeral will be attached to the same component to omit or simplify description thereof.

Figure 1:
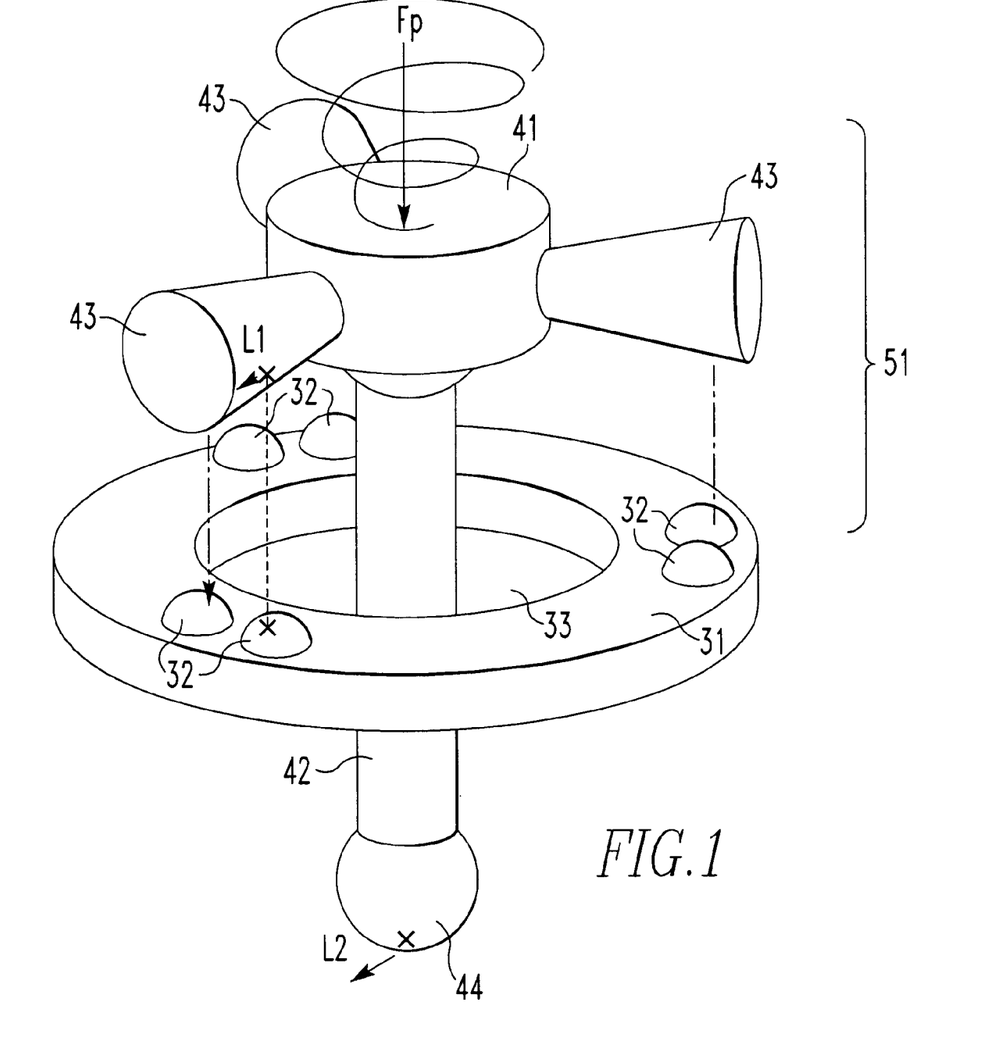
FIG. 1 is a perspective view showing a reseat system according to the first embodiment of the present invention.
Figure 2A:
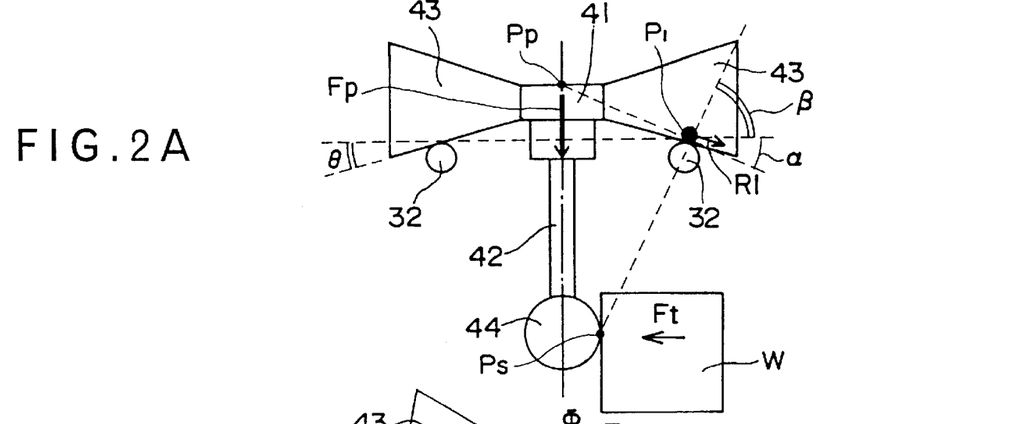
FIGS. 2(A) to (C) are schematic illustrations for showing an effect of the aforesaid embodiment.
Figure 2B:
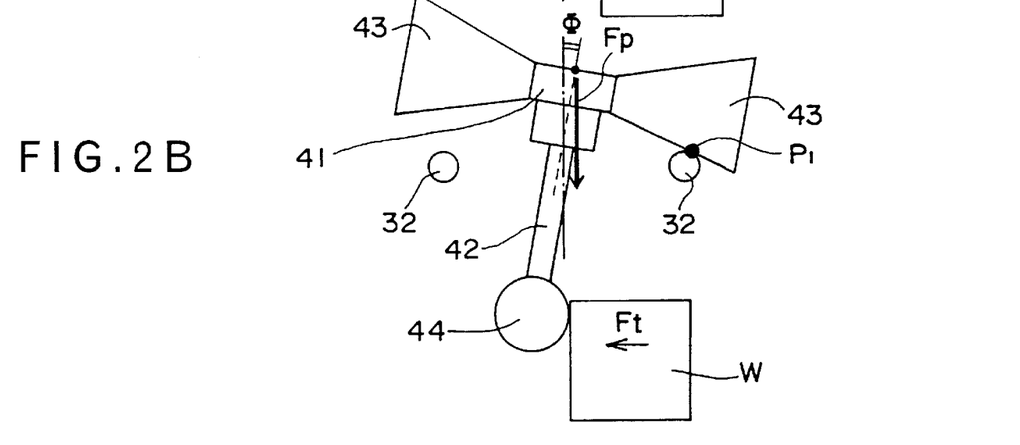
Figure 2C:
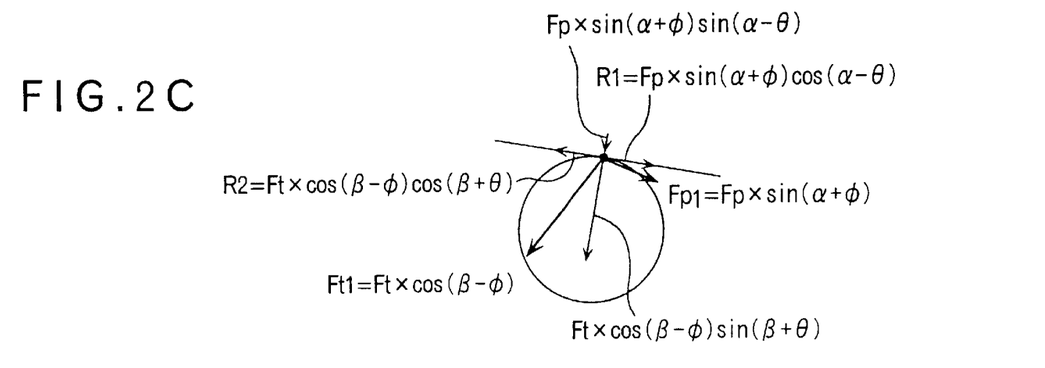

FIG. 1 is a perspective view showing a reseat system of the present embodiment and FIGS. 2(A) to 2(C) are schematic illustrations for showing an effect of the present embodiment.

A reseat system according to the present embodiment has a fixed component 31, a movable component 41 including a stylus 42, a reseat component 51 composed of the fixed component 31 and the movable component 41 mutually in contact at a plurality of spaced apart locations (three points), the reseat component thus defining the relative position of the-fixed component 31 and the movable component 41 at one location, and a biasing component (not shown) for applying biasing force Fp to forcibly contact the movable component 31 to the fixed component 41 through the reseat component 51 and to allow displacement of the movable component 41 relative to the fixed component 31 when an outside force is applied to the stylus 42.

A through hole 33 is provided at the center of the fixed component 31 for the stylus 42 of the movable component 41 to be inserted.

The movable component 41 has the stylus 42 integrally projected from the center of the lower side thereof and conical bodies 43 projected radially around an axis of the stylus 42 from an outer circumference thereof at 120 degree intervals. A contact ball 44 is formed at a lower end of the stylus 42.

The reseat component 51 is composed of three conical bodies 43 provided on the movable component 41 side, and a pair of hard balls 32 provided to the fixed component 31 side for receiving the respective conical bodies 43. The conical bodies 43 and the hard balls 32 respectively constitute the reseat component on the movable component side and the reseat component on the fixed component side of the present invention. These respective conical bodies 43 touch the hard balls 32 at two points for a total of six points. The pair of hard balls 32 are disposed so that a straight line extending radially around the stylus 42 and passing through a midpoint of the pair of hard balls 32 becomes perpendicular to a straight line connecting both centers of the hard balls 32.

The conical body 43 has a semi-conic configuration whose outer diameter enlarges from a base end to a distal end thereof, that is; a so-called reversely tapered configuration. On account of the configuration, the reseat shift can be restrained during the return movement after an outside force is applied to the movable component 41 through the stylus 42.

Specifically, since the outer diameter of the conical body 43 gets larger from the base end to the distal end, assuming that the stylus 42 displaces parallel to an axis of the rest position thereof while maintaining contact between the conical body 43 and the hard ball 32, a set of contact points L1 of the conical body 43 and the hard ball 32 drawn on the conical body 43 is inclined in biasing force Fp direction when separated from the axis of the stylus 42 at rest position. In accordance with the inclination, locus L2 drawn by the tip of the stylus 42 is inclined in the biasing force Fp direction moving away from the axis of the stylus 42 at rest position thereof.

Accordingly, a first slide force R1 as a component of biasing force Fp is caused in a direction of the locus drawn by the tip of the stylus 42 inclining relative to the biasing force Fp. When the stylus 42 is at the rest position thereof, the first slide force R1 does not displace the movable component 41 on account of frictional force at the contact point of the conical body 43 and the hard ball 32 and restriction forces on the other contact points.

In the above arrangement, as shown in FIG. 2(A), when the contact ball 44 is relatively moved to be in contact with a workpiece W, a pressing force Ft as an outside force is applied to the movable component 41 through the stylus 42 in the left direction in the figure. Incidentally, P1 represents the contact point of the conical body 43 and the hard ball 32, Ps represents contact point of the contact ball 44 and the workpiece W, and Pp represents an application point of the biasing force Fp relative to the movable component 41. Further, θ represents an angle formed by a plane for the movable component 41 to move when the tip of the stylus 42 moves along the locus L2 (referred to "contact surface" hereinafter) and a plane perpendicular to the axis of the stylus 42 at a rest position thereof, α represents an angle formed by the contact surface and a straight line connecting P1 and Ps, and β represents an angle formed by the contact surface and a straight line connecting P1 and Ps.

Subsequently, when the contact ball 44 and the workpiece W further relatively displaced as shown in FIG. 2(B), the workpiece W pushes the movable component 41 by a deviation angle Φ relative to the axis at the rest position thereof, and a component of the pressing force Ft and the biasing force Fp is applied to the contact point P1 of the conical body 43 and the hard ball 32. In considering the inclination of the contact surface at initial condition and the deviation angle Φ of the contact ball 44 and the workpiece W, a component Ft1 of the pressing force Ft and another component Fp1 of the biasing force Fp applied to the contact point P1 can be represented as follows:

$$Fp1 = Fp^*\sin(\alpha+\Phi)$$

$$Ft1 = Ft^*\cos(\beta-\Phi)$$

At this time, as shown in FIG. 2(C), the first slide force R1 can be represented by resolving Fp1 into a component parallel to the contact surface, that is:

$$R1 = Fp^*\sin(\alpha+\Phi)\cos(\alpha-\theta)$$

The first slide force R1 works as a reaction force against reseat shift.

Further, second slide force R2 is also applied to the movable component 41 for sliding the movable component 41 reversely to the first slide force R1 by virtue of the pressing force Ft. In the same manner as the first slide force R1, the second slide force R2 can be represented by resolving Ft1 as the component of the pressing force Ft into a component parallel to the contact surface, that is:

$$R2 = Ft^*\cos(\beta-\Phi)\cos(\beta+\theta)$$

According to the above, a force Fd for causing the reseat shift of the movable component 41 can be represented as a component of force parallel to the contact surface, i.e. absolute value of difference between the first slide force R1 and the second slide force R2, as follows:

$$Fd = |Ft^*\cos(\beta-\Phi)\cos(\beta+\theta) - Fp^*\sin(\alpha+\Phi)\cos(\alpha-\theta)|$$

Further, when friction coefficient of the reseat component on the fixed component side and the reseat component on the movable component side is represented as μ, a frictional force Ff applied to the contact point P1 is obtained by multiplying component of force perpendicular to the contact surface and friction coefficient μ, specifically as follows:

$$Ff = (Fp^*\sin(\alpha+\Phi)\sin(\alpha-\theta) + Ft^*\cos(\beta-\Phi)\sin(\beta+\theta))^*\mu$$

In the present embodiment, the angle θ is established so that the frictional force Ff is larger than the force Fd for causing the reseat error. More specifically, the angle θ can be defined to satisfy following inequality for the predetermined α, β, μ, Fp and Ft, and Φ determined in accordance with measurement circumstance:

$$(Fp^*\sin(\alpha+\Phi)\sin(\alpha-\theta) + Ft^*\cos(\beta-\Phi)\sin(\beta+\theta))^*\mu > |Ft^*\cos(\beta-\Phi)\cos(\beta+\theta) - Fp^*\sin(\alpha+\Phi)\cos(\alpha-\theta)|$$

Accordingly, since mutually reversely applied first slide force R1 and the second slide force R2 offset with each other to weaken the effect thereof, the force Fd for causing reseat shift of the movable component becomes smaller than the frictional force Ff, so that the reseat shift during slide movement can be prevented.

Figure 3:
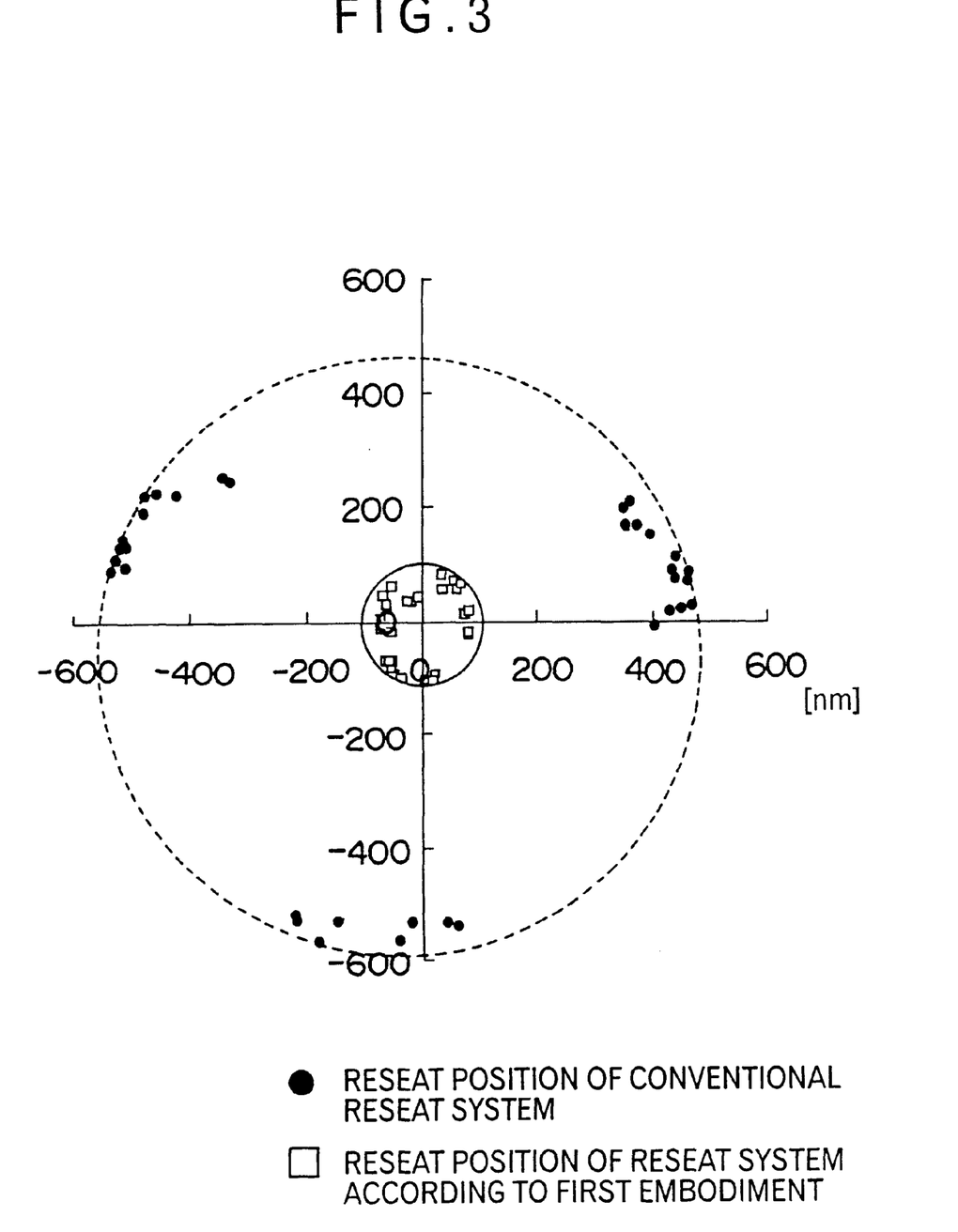
FIG. 3 is a comparison of measurement result of the aforesaid embodiment and a conventional reseat system.

FIG. 3 shows measurement and comparison result of dispersion of reseat position after return movement according to the present embodiment and the conventional art.

According to the figure, it can be observed that the dispersion of the reseat position of the present embodiment is restricted in an extremely small range of approximately 100 nm. On the other hand, the conventional reseat system having no mechanism for preventing reseat position shift causes relatively large reseat shift of 400 to 600 nm.

Therefore, it can be observed that the dispersion of the reseat position after return movement can be restrained within an extremely small range according to the reseat system of the present embodiment.

Second Embodiment

Figure 4:
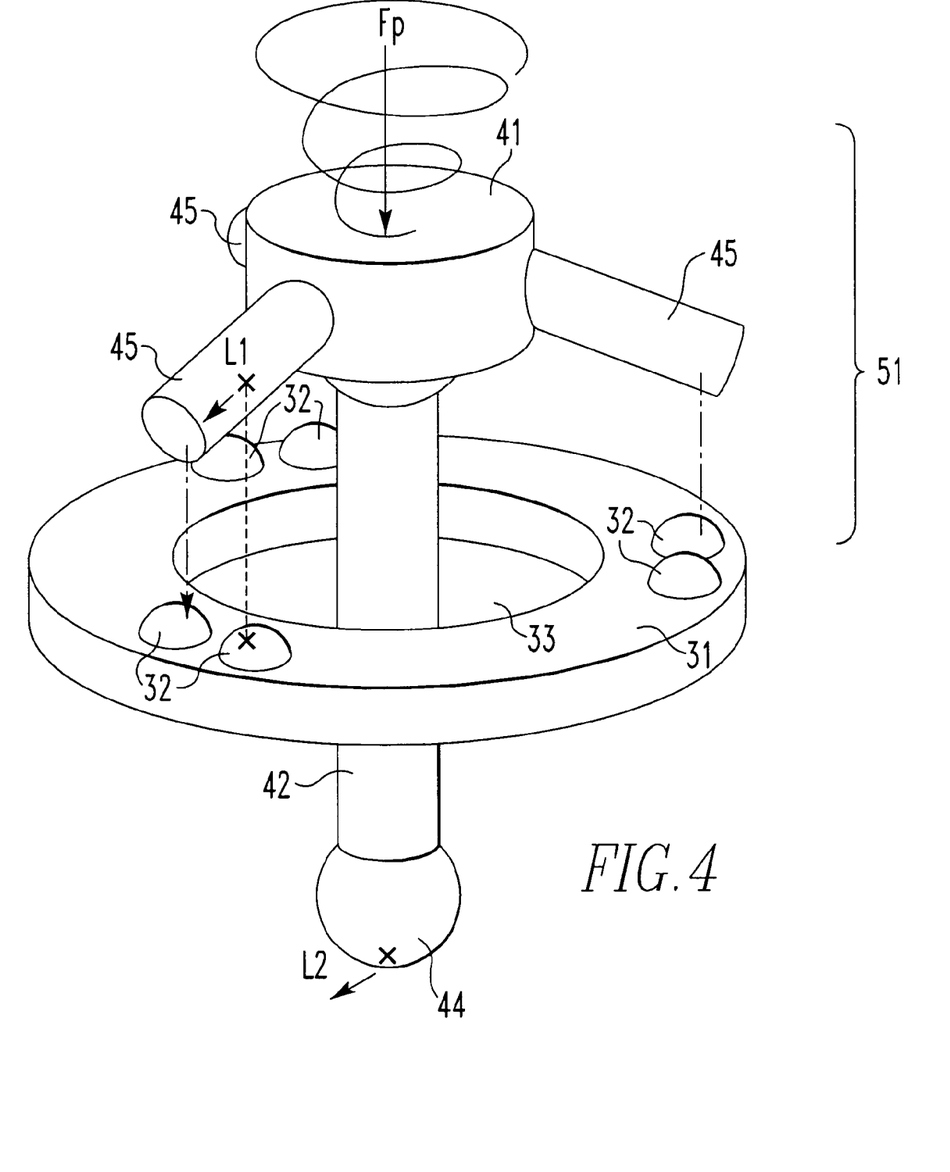
FIG. 4 is a perspective view showing a reseat system according to the second embodiment of the present-invention.

FIG. 4 is a perspective view showing a second embodiment of the present invention.

The second embodiment is the same as the first embodiment except that the reversely tapered conical body 43 of the first embodiment is replaced by a cylindrical body 45 having right circular cylinder shape.

The cylindrical body 45 as the reseat component on the movable component side is inclined in a direction of biasing force Fp applied to the movable component 41 from the base end to the distal end thereof. Incidentally, it is inclined at 15 degrees in the present embodiment.

Accordingly, assuming that the stylus 42 displaces parallel to the axis at the rest position thereof while maintaining contact between the cylindrical body 45 and the hard ball 32, the set of contact points L1 of the cylindrical body 45 and the hard ball 32 drawn on the cylindrical body 45 by the displacement is inclined in biasing force Fp direction as getting farther from the axis of the stylus 42 at the rest position thereof. In accordance with the inclination, the locus L2 drawn by the tip of the stylus 42 also is inclined in the biasing force Fp direction as getting farther from the axis of the stylus 42 at the rest position.

Therefore, in the second embodiment, a reaction force against the force for causing the position shift during an escape movement is generated at the contact point of the cylindrical body 45 as the reseat component on the movable component side and the hard ball 32 as the reseat component on the fixed component side, so that the same effect as the first embodiment can be attained.

Third Embodiment

Figure 5:
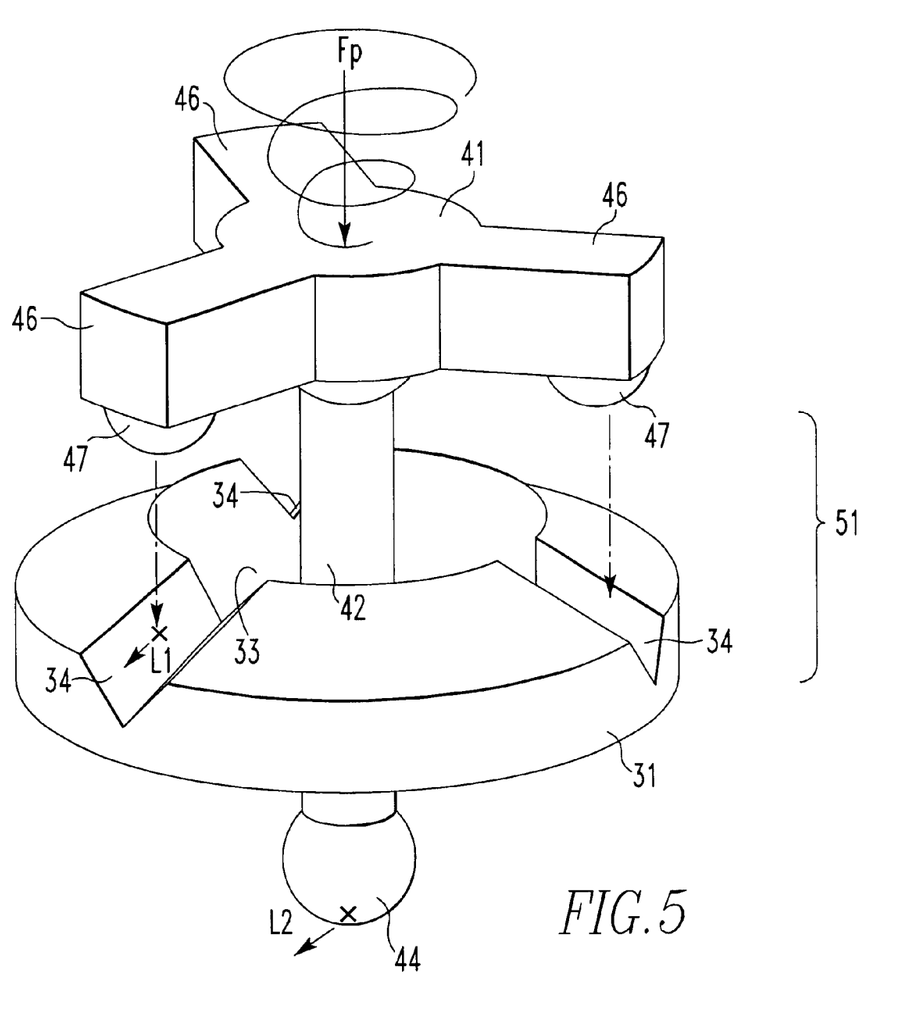
FIG. 5 is a perspective view showing a reseat system according to the third embodiment of the present invention.

FIG. 5 shows a third embodiment of the present invention. The third embodiment is the same as the first embodiment except that a sloped surface moving away from the axis of the stylus 42 inclining in the direction of the biasing force Fp is provided on the movable component 41 side of the fixed component 31 of the first embodiment. The V-shape grooves 34 as the reseat components on the fixed component side are provided on the sloped surface, the V-shape grooves having a base line inclining in the biasing force Fp direction moving away from the axis of the stylus 42. Further, three support arms 46 spaced apart at 120 degree intervals and extending in a direction perpendicular to the biasing force Fp are provided on the movable component 41 and hard balls 47 as the reseat components on the movable component side are provided at distal ends of the support arms 46.

Accordingly, assuming that the stylus 42 displaces parallel to the axis at the rest position thereof while maintaining contact between the V-shape groove 34 and the hard ball 47, the set of contact points L1 of the V-shape groove 34 and the hard ball 47 drawn on the V-shape groove 34 by the displacement is inclined in the biasing force Fp direction moving away from the axis of the stylus 42 at the rest position. In accordance with the inclination, the locus L2 drawn by the tip of the stylus 42 also is inclined in the biasing force Fp direction moving farther from the axis of the stylus 42 at rest position.

Therefore, in the third embodiment, a reaction force against the force for causing the position shift during an escape movement is generated at the contact point of the hard ball 47 as the reseat component on the movable component side and the V-shape groove 34 as the reseat component on the fixed component side, so that the same effect as the first embodiment can be attained.

Incidentally, the scope of the present invention is not restricted to the aforesaid embodiments, but includes following modifications.

In the above-described embodiments, the movable component 41 is composed of a disk having smaller diameter than the fixed component 31 or is composed of a base portion having smaller diameter and is provided with support arms. However, the configuration of the movable component according to the present invention is not restricted to the above. For instance, the movable component may be a disk having diameter identical with or larger than the fixed component 31 or may be polygon such as a triangle. Further, the configuration of the fixed component 31 is not restricted to the above circular arrangement, but may be circular base portion having support arms for supporting the reseat components on the fixed component side or may be a polygon such as a triangle having a through hole at the center thereof. In short, any configuration is possible for the fixed component and the movable component as long as the reseat component on the movable component side can be supported to correspond to the reseat component on the fixed component side.

Further, when a reversely tapered cylindrical body is used as the reseat component on the movable component side in the first embodiment, the cylindrical body may have a so-called normally tapered configuration having a diameter getting smaller from the base end to the distal end thereof. In this case, in order to cause reaction force against the force for causing position shift during escape movement at the contact point of the reseat component on the movable component side and the reseat component on the fixed component side, the cylindrical body has to be sufficiently (more than the tapered angle) inclined in the biasing force direction.

Though the hard ball 47 is used as the reseat component on movable component side and the V-shape groove 36 is used as the reseat component on fixed the component side in the third embodiment, the combination of the reseat component on the movable component side and the reseat component on fixed component side may be a pair of hard balls and a projection having a cross section such as V-shaped. Alternatively, the combination of the reseat component on movable component side and reseat component on fixed component side may be one hard ball and a wedge-shape groove having a bottom base line inclining toward the biasing force direction moving farther from the axis of the stylus.

In short, the scope of the present invention includes all of the arrangement where, assuming that the stylus displaces parallel to the axis at the rest position thereof while maintaining contact between the reseat component on the movable component side and the reseat component on the fixed component side, the locus drawn by the tip of the stylus is inclined in a direction of the biasing force for pressing the movable component onto the fixed component, so that the reaction force against the force for causing reseat shift is generated during an escape movement on the movable component.

What is claimed is:

1. A reseat system, comprising:
    a fixed component;
    a movable component having a stylus to be settled at a predetermined rest position;
    first reseat components provided at three places on the fixed component mutually spaced apart; and
    second reseat components provided on the movable component to be in contact with the first reseat components at predetermined contact points, wherein, assuming that a first reseat component and a second reseat component corresponding thereto keep contact with each other when the stylus moves while keeping an axis of the stylus substantially parallel with an axis thereof at the rest position, a locus drawn by the tip of the stylus crosses the axis of the stylus at the rest position; and wherein, when an outside force is applied to the movable component, the tip of the stylus of the movable component can be displaced relative to the fixed component by releasing contact of either one of a first and second reseat component and, when the outside force is ceased to be applied to the movable component, the movable component returns to the rest position by a biasing force applied to the movable component in a direction from a base end of the stylus to a distal end thereof;

the reseat system being characterized in that for the stylus to move away from the rest position, assuming the first and second reseat components keep contact while maintaining the axis of the stylus substantially parallel with the axis thereof at rest, the locus drawn by the tip of the stylus is inclined in the direction of the biasing force moving away from the axis of the stylus at the rest position.

2. A reseat system, comprising:

a fixed component;

a movable component having a stylus to be settled at a predetermined rest position;

first reseat components provided at three places on the fixed component mutually spaced apart; and second reseat components provided on the movable component to be in contact with the first reseat components at predetermined contact points, wherein, assuming that a first reseat component and a second reseat component corresponding thereto keep contact with each other and the stylus moves while keeping an axis of the stylus substantially parallel with an axis thereof at the rest position, a locus drawn by a tip of the stylus crosses the axis of the stylus at the rest position; and wherein, when an outside force is applied to the movable component, the tip of the stylus of the movable component can be displaced relative to the fixed component by releasing contact of either one of the first and the second reseat component and, when the outside force is ceased to be applied to the movable component, the movable component returns to the rest position by a biasing force applied to the movable component in a direction from a base end of the stylus to a distal end thereof;

such that, when an angle between the locus drawn by the tip of the stylus and a plane perpendicular to the axis of the stylus at the rest position is represented by $\theta$, $\theta$ satisfies the following inequality of:

$$(Fp^*\sin(\alpha+\Phi)\sin(\alpha-\theta)+Ft^*\cos(\beta-\Phi)\sin(\beta+\theta))^*\mu > |Ft^*\cos(\beta-\Phi)\cos(\beta+\theta) - Fp^*\sin(\alpha+\Phi)\cos(\alpha-\theta)|$$

where $\alpha$ represents an angle formed by a straight line connecting a point on which the biasing force is applied to the movable component and a contact point of the first and the second reseat component and the plane perpendicular to the axis of the stylus at the rest position;

$\beta$ represents an angle formed by a point on which the outside force is applied to the stylus and the contact point of the first and the second reseat component and the plane perpendicular to the axis of the stylus at the rest position;

$\Phi$ represents an angle formed by the axis of the stylus when the outside force is applied to the stylus and the axis of the stylus at the rest position thereof;

Fp represents a magnitude of the biasing force;

Ft represents a magnitude of the outside force; and $\mu$ represents friction coefficient of the first and the second reseat component.

3. The reseat system according to claim 2, wherein either one of the first and the second reseat components is a conical shape having larger outer diameter on an end remote from the stylus than on an end adjacent to the stylus and the other reseat component is a pair of balls.

4. The reseat system according to claim 2, wherein either one of the first and second reseat components is a cylinder having predetermined inclination in an axial direction greater than zero sufficient to oppose resaet shift and the other is a pair of balls.

5. The reseat system according to claim 2, wherein either one of the first and the second reseat components is a conical shape having larger outer diameter on an end remote from the stylus than an end adjacent to the stylus and the other reseat component is a pair of cylinders arranged in V-shape.

6. The reseat system according to claim 2, wherein either one of the first and the second reseat components is a cylinder having predetermined inclination in an axial direction greater than zero sufficient to oppose reseat shift and the other reseat component is a pair of cylinders arranged in V-shape.

7. The reseat system according to claim 2, wherein either one of the first and the second reseat components is a ball and the other is a V-shaped groove having a predetermined inclination in an axial direction greater than zero sufficient to oppose reseat shift.

8. A reseat system, comprising:

a fixing component;

a movable component having a stylus to be settled at a predetermined rest first reseat components provided at three places on the fixed component mutually spaced apart; and second reseat components provided on the movable component to be in contact with the first reseat components at predetermined contact points, wherein either one of the first and the second reseat components is a conical shape having larger outer diameter on a side remote from the stylus than outer diameter on a side adjacent to the stylus and the other reseat component is the pair balls, wherein, assuming that a first reseat component and a second reseat component corresponding thereto keep contact with each other when the stylus moves while keeping an axis of the stylus substantially parallel with an axis thereof at the rest position, a locus drawn by the tip of the stylus crosses the axis of the stylus at the rest position; and wherein, when an outside force is applied to the movable component, the tip of the stylus of the movable component can be displaced relative to the fixed component by releasing contact of either one of a first and second reseat component and, when the outside force is ceased to be applied to the movable component, the movable component returns to the rest position by a biasing force applied to the movable component in a direction from a base end of the stylus to a distal end thereof;

the reseat system being characterized in that for the stylus to move away from the rest position, assuming the first and second resea components keep contact while maintaing the axis of the stylus substantially parallel with the axis thereof at rest, the locus drawn by the tip of the stylus is inclined in the direction of the biasing force moving away from the axis of the stylus at the rest position.

9. A reseat system, comprising:

a fixed component;

a movable component having a stylus to be settled at a predetermined rest position;

first reseat components provided at three places on the fixed component mutually spaced apart; and second reseat components provided on the movable component to be in contact with the first reseat components at predetermined contact points, wherein either one of the first and the second reseat components is a cylinder having predetermined inclination in an axial direction greater than zero sufficient to oppose reseat shift and the other reseat component is a pair of balls, wherein, assuming that a first reseat compnent and a second reseat component corresponding thereto keep contact with each other when the stylus moves while keeping an axis of the stylus substantially parallel with an axis thereof at the rest position, a locus drawn by the tip of the stylus crosses the axis of the stylus at the rest position; and wherein, when an outside force is applied to the movable component, the tip of the stylus of the movable component can be displaced relative to the fixed component by releasing contact of either one of a first and second reseat component and, when the outside force is ceased to be applied to the movable component, the movable component returns to the rest position by a biasing force applied to the movable component in a direction from a base end of the stylus to a distal end thereof;

the reseat system being characterized in that for the stylus to move away from the rest position, assuming the first and second reseat components keep contact while maintaining the axis of the stylus substantially parallel with the axis thereof at rest, the locus drawn by the tip of the stylus is inclined in the direction of the biasing force moving away from the axis of the stylus at the rest position.

10. A reseat system, comprising:

a fixed component;

a movable component having a stylus to be settled at a predetermined rest position;

first reseat components provided at three places on the fixed component mutually spaced apart; and second reseat components provided on the movable component to be in contact with the first reseat components at predetermined contact points, wherein either one of the first and the second reseat components is a conical shape having larger outer diameter on an end remote from the stylus than on an end adjacent to the stylus and the other reseat component is a pair of cylinders arranged in V-shape, wherein, assuming that a first reseat component and a second reseat component corresponding thereto keep contact with each other when the stylus moves while keeping an axis of the stylus crosses the axis of the stylus at the rest position; and wherein, when an outside force is applied to the movable component, the tip of the stylus of the movable component can be displaced relative to the fixed component by releasing contact of either one of a first and second reseat component and, when the outside force is ceased to be applied to the movable component, the movable component returns to the rest position by a biasing force applied to the movable component in a direction from a base end of the stylus to a distal end thereof;

the reseat system being characterized in that for the stylus to move away from the rest position, assuming the first and second reseat components keep contact while maintaining the axis of the stylus substantially parallel with the axis thereof at rest, the locus drawn by the tip of the stylus is inclined in the direction of the biasing force moving away from the axis of the stylus at the rest position.

11. A reseat system, comprising:

a fixed component;

a movable component having a stylus to be settled at a predetermined rest position;

first reseat components provided at three places on the fixed component mutually spaced apart; and second reseat components provided on the movable component to be in contact with the first reseat components at predetermined contact points, wherein either one of the first and the second reseat components is a cylinder having predetermined inclination in an axial direction greater than zero sufficient to oopose reseat shift and the other reseat component is a pair of cylinders arranged in V-shape, wherein, assuming that a first reseat component and a second reseat component corresponding thereto keep contact with each other when the stylus moves while keeping an axis of the stylus substantially parallel with an axis thereof at the rest position, a locus drawn by the tip of the stylus crosses the axis of the stylus at the rest position; and wherein, when an outside force is applied to the movable component, the tip of the stylus of the movable component can be displaced relative to the fixed component by releasing contact of either one of a first and second reseat component and, when the ouside force is ceased to be applied to the movable component, the movable component, the movable component returns to the rest position by a biasing force applied to the movable component in a direction from a base end of the stylus to a distal end thereof;

the reseat system being characterized in that for the stylus to move away from the rest position, assuming the first and second reseat components keep contact while maintaining the axis of the stylus substantially parallel with the axis thereof at rest, the locus drawn by the tip of the stylus is inclined in the direction of the biasing force moving away from the axis of the stylus at the rest position.

12. A reseat system, comprising:

a fixed component;

a movable component having a stylus to be at a predetermined rest position;

first reseat components provided at three places on the fixed component mutually spaced apart; and second reseat components provided on the movable component to be in contact with the first reseat components at predetermined contact points, wherein either one of the first and the second reseat components is a ball and the other is a V-shaped groove having a predetermined inclination in an axial direction greater than zero sufficient to oppose reseat shift, wherein, assuming that a first reseat component and a second reseat component corresponding thereto keep contact with each other when the stylus moves while keeping an axis of the stylus substantially parallel with an axis thereof at the rest position, a locus drawn by the tip of the stylus crosses the axis of the stylus at the rest position; and wherein, when an outside force is applied to the movable component, the tip of the stylus of the movable component can be displaced relative to the fixed component by releasing contact of either one of a first and second reseat component and, when the outside force is ceased to be applied to the movable component, the movable component returns to the rest position by a biasing force applied to the movable component in a direction from a base end of the stylus to a distal end thereof;

the reseat system being characterized in that for the stylus to move away from the rest position, assuming the first and second reseat components keep contact while maintaining the axis of the stylus substantially parallel with the axis thereof at rest, the locus drawn by the tip of the stylus is inclined in the direction of the biasing force moving away from the axis of the stylus at the rest position.

* * * * *